(12) United States Patent
El-Sayed et al.

(10) Patent No.: US 7,778,301 B2
(45) Date of Patent: Aug. 17, 2010

(54) CADMIUM SULFIDE QUANTUM DOT LASING IN ROOM TEMPERATURE LIQUID SOLUTION

(75) Inventors: Mostafa A. El-Sayed, Atlanta, GA (US);
Wei Qian, Marietta, GA (US); Qusai Darugar, Houston, TX (US)

(73) Assignee: Georgia Tech Research Corporation, Atlanta, GA (US)

( * ) Notice: Subject to any disclaimer, the term of this patent is extended or adjusted under 35 U.S.C. 154(b) by 30 days.

(21) Appl. No.: 12/215,158

(22) Filed: Jun. 25, 2008

(65) Prior Publication Data

US 2009/0084985 A1  Apr. 2, 2009

Related U.S. Application Data

(60) Provisional application No. 60/946,165, filed on Jun. 26, 2007.

(51) Int. Cl.
*H01S 3/14* (2006.01)
*H01S 3/20* (2006.01)

(52) U.S. Cl. .......................................... 372/51; 372/39
(58) Field of Classification Search .................. 372/51
See application file for complete search history.

(56) References Cited

U.S. PATENT DOCUMENTS

| 6,939,604 | B1 * | 9/2005 | Guyot-Sionnest et al. | ... 428/323 |
| 2006/0227837 | A1 * | 10/2006 | Lee et al. | ............... 372/50.124 |

OTHER PUBLICATIONS

A. P. Alivisatos, "Semicondutor Clusters, Nanocrystals, and Quantum Dots", Science, vol. 271, pp. 933-937, (Feb. 16, 1996).
D. J. Norris and M. G. Bawendi, Measurement and Assignment of the Size-Dependent Optical Spectrum in CdSe Quantum Dots, Physical Review B, vol. 53, No. 24, pp. 16 338-16 346 (Jun. 15, 1996).
A. L. Efros and M. Rosen, "The Electronic Structure of Semiconductor Nanocrystals", Annual Review of Materials Science, vol. 30,, pp. 475-521 (Aug. 2000).
Y. Arakawa and H. Sakaki, Mutilidimensional Quantum Well Laser and Temperature Dependence of Its Threshold Current, Applied Physics Letters vol. 40, pp. 939-941 (Jun. 1, 1982).
M. Asada, Y. Miyamoto, and Y. Suematsu, "Gain and the Threshold of three-Dimensional Quantum-Box Lasers", IEEE Journal of Quantum Electronics, QE-22, No. 9, pp. 1915-1921, Sep. 1986.

(Continued)

*Primary Examiner*—Armando Rodriguez
(74) *Attorney, Agent, or Firm*—Thomas, Kayden, Horstemeyer & Risley, LLP

(57) ABSTRACT

Disclosed is a lasing complex comprising a room temperature solution containing cadmium sulfide (CdS) quantum dots. Optical gain has been observed in CdS nanocrystal quantum dots in strong confinement regime in toluene solution at room temperature using femtosecond transient absorption techniques. The optical gain lifetime is measured to be 20 picoseconds under pump fluence of 0.77 mJ/cm$^2$. The relative lower gain threshold compared to that of CdSe quantum dots is attributed to the long lifetime of fluorescence and biexcitons and the relatively sharp photoluminescence linewidth. The CdS nanocrystals are excellent gain media for semiconductor quantum dot based blue lasers.

21 Claims, 2 Drawing Sheets

OTHER PUBLICATIONS

V. I. Klimov, A. A. Mikhailovsky, S. Xu, A. Malko, J. A. Hollingsworth, C. A. Leatherdale, H. J. Eisler, and M. G. Bawendi, "Optical Gain and Stimulated Emission in Nanocrystal Quantum Dots", Science vol. 290, pp. 314-317 (Oct. 13, 2000).

A. A. Milailovsky, A. V. Malko, J. A. Hollingsworth, M. G. Bawendi, and V. I. Klimov, "Multiparticle Interactions and Stimulated Emission in Chemically Synthesized Quantum Dots", Applied Physics Letters, vol. 80, No. 13, pp. 2380-2382 (Apr. 1, 2002).

S. Link and M. A. El-Sayed, "Room Temperature Optical Gain in CdSe Nanorod Solutions", Journal of Applied Physics 92,6799 (2002).

V. C. Sundar, H. J. Eisler, and M. G. Bawendi, "Room-Temperature, Tunable Gain media from Novel II-IV Nanocrystal-Titania Composite Matrices", Advanced Materials vol. 14, No. 10, pp. 739-743, (May 17, 2002).

Y. Chan, J. M. Caruge, P. T. Snee, and M. G. Bawendi, "Multiexcitonic Two-State Lasing in a CdSe Nanocrytal Laser", Applied Physics Letters, vol. 85,, No. 13, pp. 2460-2462 (Sep. 27, 2004).

G. Chen, R. Rapaport, D. T. Fuchs, L. Lucas, A. J. Lovinger, S. Vilan, A. Aharoni, and U. Banin, "Optical Gain from InAs Nanocrystal Quantum Dots in a Polymer Matrix", Applied Physics Letters vol. 87, pp. 251108-1 to 251108-3, (Dec. 16, 2005).

R. D. Schaller, M. A. Petruska, and V. I. Klimov, "Tunable Near-Infrared Optical Gain and Amplified Spontaneous Emission using PbSe Nanocrystals", Journal of Physical Chemistry B 107, pp. 13765-13768 (Nov. 21, 2003).

J. Butty, Y. Z. Hu, N. Peyghambarian, Y. H. Kao, and J. D. Mackenzie, "Quasicontinuous Gain in Sol-Gel Derived CdS Quantum Dots", Applied Physics Letters vol. 67, No. 18, pp. 2672-1674, (Oct. 30, 1995).

Y. Chan, J. S. Steckel, P. T. Snee, J. M. Caruge, J. M. Hodgkiss, D. G. Nocera, and M. G. Bawendi, "Blue Semiconductor Nanocrystal Laser", Applied Physics Letters, vol. 86, pp. 073102-1 to 173102-3 (Feb. 7, 2005).

C. B. Murray, D. J. Norris, and M. G. Bawendi, "Synthesis and Characterization of nearly Monodisperse CdE (E=S, Se, Te) Semiconductor nanocrystallites", Journal of the American Chemical Society, vol. 115, pp. 8706-8715 (Sep. 1993).

Z. A. Peng and X. G. Peng, "Formation of High-Quality CdTe, CdSe, and CdS Nanocrystals Using CdO as Precursor", Journal of the American Chemical Society, vol. 123, pp. 183-184, (Dec. 9, 2000).

W. Y. Huang, W. Qian, and M. A. El-Sayed, Nano, "Coherent Vibrational Oscillation in Gold Prismatic Monolayer Periodic Nanoparticle Arrays", Letters, vol. 4, No. 9, pp. 1741-1747 (Aug. 10, 2004).

J. Y. Zhang, X. Y. Wang, M. Xiao, L. Qu, and X. Peng, "Lattice Contration in Free-Standing CdSe Nanocrystals", Applied Physics Letters, vol. 81, No. 11, pp. 2076-2078 (Sep. 9, 2002).

W. W. Yu, L. H. Qu, W. Z. Guo, and X. G. Peng, "Experimental Determination of the Extinction Coefficient of CdTe, CdSe, and CdS Nanocrystals", Chemistry of Materials, vol. 15, pp. 2854-2860 (Jun. 7, 2003).

F. Wu, J. Z. Zhang, R. Kho, and R. K. Mehra, "Radiative and Nonradiative Lifetimes of Band Edge States and Deep Trap Sttes of CdS Nanoparticles Determined by Time-Correlated Single Photon Counting", Chemical Physics Letters 330,237 (2000).

S. A. Crooker, J. A. Hollingsworth, S. Tretiak, and V. I. Klimov, "Spectrally Rsolved Dynamics of Energy Transfer in Quantum-Dot Assemblies: Towards Engineered Energy Flows in Artificial Materials", Physical Review Letters, vol. 89, No. 18, pp. 186802-1 to 186802-4 (Oct. 28, 2002).

M. Kazes, D. Y. Lewis, Y. Ebenstein, T. Mokari, and U. Banin, "Lasing from Semiconductor Quantum Rods in a Cylindrical Microcavity", Advanced Materials vol. 14, No. 4, pp. 317-321 (Feb. 19, 2002).

Y. Z. Hu, H. Giessen, N. Peyghambarian, and S. W. Koch, "Microscopic Theroy of Optical Gain in Small Semiconductor Quantum Dots", Physical Review B, vol. 53, No. 8, pp. 4814-4822 (Feb. 15, 1996).

V. I. Klimov, C. J. Schwarz, D. W. McBranch, C. A. Leatherdale, and M. G. Bawendi, "Ultrafast Dynamics of Inter-Intraband Transitions in Semiconductor Nanocrystals: Implications for Quantum-Dot Lasers" Physical Review B, vol. 60, No. 4, pp. R2177-R2180 (Jul. 15, 1999).

D. F. Underwood, T. Kippeny, and S. J. Rosenthal, "Ultrafast Carrier Dynamics in CdSe Nanocrystals Determined by Femtosecond Fluorescence Upconversion Spectroscopy", Journal of Physical Chemistry B, vol. 105, pp. 436-443 (Jan. 18, 2001).

V. I. Klimov, A. A. Mikhailovsky, D. W. McBranch, C. A. Leatherdale, and M. G. Bawendi, "Quantization of Multiparticle Auger Rates in Semiconductor Quantum Dots", Science, vol. 287, pp. 1011-1013 (Feb. 11, 2000).

\* cited by examiner

CADMIUM SULFIDE QUANTUM DOT LASING IN ROOM TEMPERATURE LIQUID SOLUTION

CROSS REFERENCE TO RELATED APPLICATIONS

This application claims priority to copending U.S. provisional application entitled "CDS Quantum Dot Lasing in Room Temperature Liquid Solution" having Ser. No. 60/946,165, filed Jun. 26, 2007.

STATEMENT REGARDING FEDERALLY SPONSORED RESEARCH OR DEVELOPMENT

This invention was made with U.S. Government support under agreement no. DMR-0527297, awarded by the National Science Foundation. The Government has certain rights in this invention.

BACKGROUND

The present invention relates to laser apparatus, and more particularly, to laser apparatus comprising cadmium sulfide (CdS) quantum dots in a room temperature liquid solution.

Semiconductor nanocrystal quantum dots have attracted great attention due to their tunable electronic and optical properties arising from three-dimensional quantum confinement effects. This is discussed in publications by A. P. Alivisatos, Science 271, 933 (1996), D. J. Norris and M. G. Bawendi, Physical Review B 53, 16338 (1996), and A. L. Efros and M. Rosen, Annual Review of Materials Science 30, 475 (2000).

The advantages of using semiconductor quantum dots in the strong confinement regime as gain media in lasing devices (due to their predicted reduced lasing threshold and improved temperature stability) are the driving forces in the development of semiconductor quantum dots based lasers. This is discussed in publications by Y. Arakawa and H. Sakaki, Applied Physics Letters 40, 939 (1982), and M. Asada, Y. Miyamoto, and Y. Suematsu, IEEE Journal of Quantum Electronics 22, 1915 (1986).

A large amount of study has been devoted to optical gain and amplified spontaneous emission (ASE) in semiconductor nanocrystals. Some of these publications address amplified spontaneous emission in the visible range with wavelengths longer than 500 nm using CdSe (540-680 nm). See for example, V. I. Klimov, A. A. Mikhailovsky, S. Xu, A. Malko, J. A. Hollingsworth, C. A. Leatherdale, H. J. Eisler, and M. G. Bawendi, Science 290, 314 (2000), A. A. Mikhailovsky, A. V. Malko, J. A. Hollingsworth, M. G. Bawendi, and V. I. Klimov, Applied Physics Letters 80, 2380 (2002), S. Link and M. A. El-Sayed, Journal of Applied Physics 92, 6799 (2002), V. C. Sundar, H. J. Eisler, and M. G. Bawendi, Advanced Materials 14, 739 (2002), and Y. Chan, J. M. Caruge, P. T. Snee, and M. G. Bawendi, Applied Physics Letters 85, 2460 (2004).

Another publication addresses the near-infrared range using PbSe (1425-1625 nm). See R. D. Schaller, M. A. Petruska, and V. I. Klimov, Journal of Physical Chemistry B 107, 13765 (2003). Another publication addresses the near-infrared range using InAs (1570 nm). See G. Chen, R. Rapaport, D. T. Fuchs, L. Lucas, A. J. Lovinger, S. Vilan, A. Aharoni, and U. Banin, Applied Physics Letters 87, 251108 (2005).

Furthermore, the observations of optical gain and ASE in quantum dots were from self-assembled close-packed quantum dot films or quantum dots in solid matrices, and none were in solution. For high power lasers, liquids are advantageous for heat circulation and dissipation.

As a direct wide band gap semiconductor, CdS nanocrystal quantum dots are an excellent candidate for realizing optical gain and ASE in the blue spectral range. Optical gain in sol-gel derived CdS nanocrystal quantum dots embedded in glass matrices pumped by intense nanosecond laser pulses was observed at low temperature (below 170° K) by Butty et al. in 1995. See J. Butty, Y. Z. Hu, N. Peyghambarian, Y. H. Kao, and J. D. Mackenzie, Applied Physics Letters 67, 2672 (1995).

With advances in incorporating quantum dots into host matrices, Chan et al. recently observed lasing in the blue spectral region from core-shell CdS/ZnS nanocrystals stabilized in a sol-gel derived silica matrix pumped by 100 femtosecond (fs) laser pulses at 400 nm. See Y. Chan, J. S. Steckel, P. T. Snee, J. M. Caruge, J. M. Hodgkiss, D. G. Nocera, and M. G. Bawendi, Applied Physics Letters 86, 073102 (2005).

However, until now, optical gain dynamics and measurement of optical gain lifetime have not been reported for CdS quantum dots and certainly not for a solution of CdS quantum dots at room temperature.

It would be advantageous to have lasing apparatus comprising cadmium sulfide (CdS) quantum dots in a room temperature liquid solution.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Disclosed herein are nanoparticle lasing complexes that comprise a room temperature solution comprising quantum dots that each have an average diameter between 3 and 6 nanometers. All quantum dots in the solution are substantially the same size, and each quantum dot is capped with a capping material that passivates and protects the surface, maximizes the emission yield, reduces the line width of the emission from the quantum dot, and acts to suspend the quantum dot in the solution. The solution may preferably comprise toluene or water. The capping material may comprise a wide bandgap semiconductor material such as zinc sulfide, or an organic molecule such as tri-n-octylphosphine oxide (TOPO).

Also disclosed herein is exemplary laser apparatus comprising cadmium sulfide (CdS) quantum dots in a room temperature liquid solution. The exemplary laser apparatus is based upon experimental results of optical gain dynamics in strongly confined CdS quantum dots dissolved in a toluene solution at room temperature using femtosecond transient absorption technique. Because of the long lifetime of electrons and holes and narrow fluorescence band width, one can observe gain with a low threshold in the solution of CdS quantum dots at room temperature. Laser apparatus comprising a solution of cadmium sulfide (CdS) quantum dots at room temperature is also disclosed.

Optical gain dynamics was studied for two CdS quantum dot samples dispersed in toluene at room temperature. This was carried out by using femtosecond transient absorption technique with an excitation at 400 nm and gain measurement was studied at the fluorescence maxima (440 nm and 460 nm). The optical gain lifetime was found to be as long as 20 picoseconds under pump fluence as low as 0.77 mJ/cm$^2$. The low threshold is the result of long lifetime of electrons and holes and narrow emission band width. These results suggest that CdS quantum dots in solution are excellent gain media for optically pumped high power blue lasers.

Figure 1:
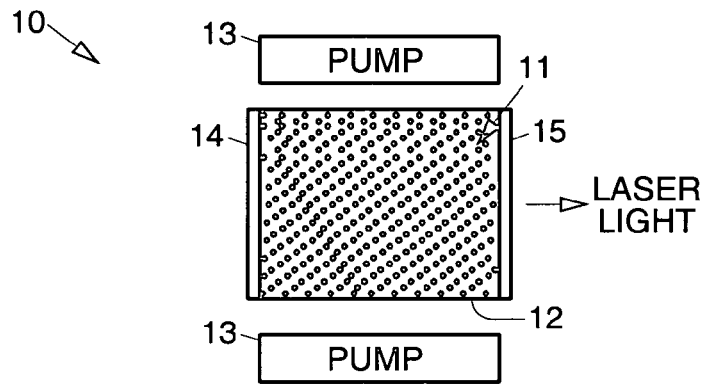
FIG. 1 illustrates exemplary laser apparatus comprising cadmium sulfide (CdS) quantum dots in a room temperature liquid solution.

Referring to the drawing figures, FIG. 1 illustrates exemplary laser apparatus 10 comprising cadmium sulfide (CdS) quantum dots 11 in a room temperature liquid solution 12. A reflector 14 or mirror 14 is disposed adjacent one end of the solution 12 and a partial reflector 15 or partially reflective mirror 15 is disposed adjacent an opposite end of the solution 12 so as to create a resonant cavity enclosing the solution 12. Apparatus, such as a pump source 13, is provided for exciting the solution 12 of cadmium sulfide (CdS) quantum dots 11 to produce lasing of the quantum dots 11.

CdS nanocrystal quantum dots 11 were prepared by using a method similar to the one used by C. B. Murray, D. J. Norris, and M. G. Bawendi, Journal of the American Chemical Society 115, 8706 (1993), and modified by Z. A. Peng and X. G. Peng, Journal of the American Chemical Society 123, 183 (2001).

Instead of using a more common sulfur and tri-n-octylphosphine (TOP) complex, bis(trimethylsilyl)sulfide [(TMS)$_2$Se] was used. In a typical synthesis, 0.2 g CdO (Sigma) was mixed in a flask with 3 grams of tri-n-octylphosphine oxide (TOPO), 1 gram stearic acid and heated to 280° C. Once the solution in the flask became optically clear, 0.5 ml of (TMS)$_2$Se was rapidly added. The solution 12 turned yellow immediately and the growth of CdS nanocrystal quantum dots 11 was monitored using a Shimadzu UV-3101-PC spectrophotometer. The size and morphology of the nanoparticles (nanocrystal quantum dots 11) were examined using a JEOL 1 OOCX II transmission electron microscope (TEM). Nanosecond time-resolved photoluminescence decay was measured using a PTI model C-72 fluorescence lifetime spectrometer. The CdS quantum dot solution 12 was excited by laser pulses (0.8 ns, 10 Hz) at 337 nm generated from a PTI-GL-3300 nitrogen pulsed laser 13 and photoluminescence was detected using a switchable analog/photon counting photomultiplier tube that was configured to exhibit biexponential decay.

Optical gain measurements at room temperature were performed using a femtosecond transient absorption technique, which is described by W. Y. Huang, W. Qian, and M. A. El-Sayed, Nano Letters 4, 1741 (2004). 100 fs laser pulses at 400 μm from the pulsed laser 13 was used as a pump light beam and femtosecond white light continuum ranging from 400 nm to 1100 nm with 1 kHz repetition rate was used as a probe light beam, respectively. The pump and probe beams were focused and overlapped at the sample with a diameter of about 250 μm. Time delays between the pump and probe beams were controlled by an optical delay line with a resolution of 3 μm (20 fs).

In order to investigate the effects of sample quality on optical gain properties, two samples of the solution 12 were prepared with different initial Cd:S ratio of the precursors. Using initial ratio of Cd:S to control the final quality of CdS quantum dots is motivated by the work of Zhang et al. See J. Y. Zhang, X. Y. Wang, M. Xiao, L. Qu, and X. Peng, Applied Physics Letters 81, 2076 (2002). Zhang et al. demonstrated that with Se precursor initially in excess, which provides relatively stable environment during the surface optimization/reconstruction process, CdSe nanocrystals could be synthesized with high lattice quality.

Figure 2A:
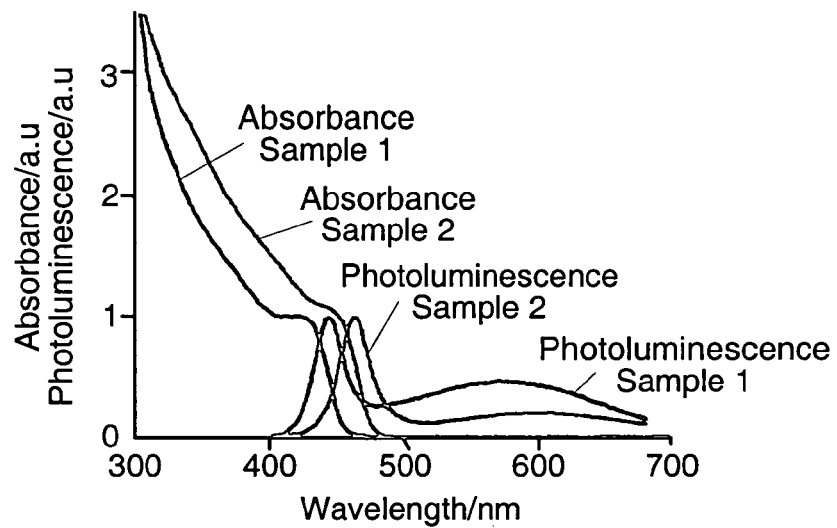
FIG. 2a illustrates absorption and photoluminescence spectra of two samples.
Figure 2B:
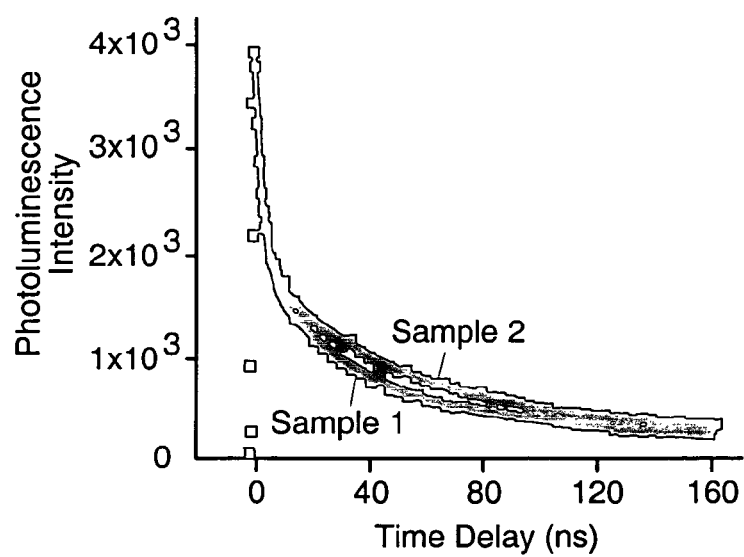
FIG. 2b illustrates photoluminescence decay of the samples.

A biased amount of S precursor was used to make two sample solutions of quantum dots 11 for study. First and second sample solutions of quantum dots 11 were prepared under excess Cd and S precursor, respectively. As shown in FIGS. 2a and 2b, these two sample solutions of quantum dots 11 have different quality, indicated by their photoluminescence quantum yields. The absorption and photoluminescence spectra of the two sample solutions of quantum dots 11 are presented in FIG. 2a. Due to the strong quantum confinement, the first absorption maxima is blue shifted from the bulk CdS absorption edge at 500 nm to 420 nm for the first sample solution of quantum dots 11 and to 440 nm for the second sample solution of quantum dots 11.

The average sizes of CdS quantum dots 11 estimated from the wavelengths of the first absorption maxima using the empirical equation in the Zhang et al. paper are about 4.0 nm and 4.8 nm for the first and second solutions of quantum dots 11, respectively. The real size of the first solution of quantum dots 11 was also directly measured from its TEM image (FIG. 2a) and gave an average diameter of 3.8 nm, close to the estimation. The photoluminescence spectra (FIG. 2a) show two emission bands.

The peaks in the blue region at 440 nm for the first solution of quantum dots 11 and at 460 nm for the second solution of quantum dots 11 are from band edge emission. The linewidth of band edge emission is pretty narrow, approximately 28 nm (full-width half-maximum, FWHM).

The narrow emission helps to decrease optical gain threshold in two ways. First, the sharp band edge emission indicates a narrow size-distribution so the percentage of the quantum dots 11 in the subgroup of an ensemble of quantum dots 11, which contributes to optical gain measurement, is higher compared to a sample with broad size-distribution. Second, the fluorescence resonance energy transfer within quantum dots 11 serving as a channel for losing absorbed optical energy is inhibited further due to narrow size distribution and emission band. Beside the sharp band edge emission, there are broad emission bands on the red side from 500 nm to 700 nm. These are assigned to deep trap emissions. The intensity of the deep trap emission is used to characterize the quality of sample because it results from the nonradiative electron and hole losses to the defects and impurities on the surface and/or within the quantum dots 11.

The photoluminescence quantum yields of the band edge (deep trap) emission were 20% (30%) and 32% (12%) for the first and second solutions of quantum dots 11, respectively, by comparing the integrated photoluminescence intensities of the quantum dots to the well characterized dye (Coumarin 460). It is clear that sample 2 has better quality than sample 1.

As it is shown in FIG. 2b, the bandedge emission has a long lifetime and suggests that the trap emission is populated from higher excited states. FIG. 2b shows the photoluminescence decay of the two solutions of quantum dots 11. The signal is fitted to a biexponential decay with time constants (amplitudes) of 2.7 ns (0.55) and 41 ns (0.45) for the first sample 12 and 2.5 ns (0.42) and 52 ns (0.58) for the second sample 12.

The faster decay component of 2.7 (2.5) ns is due to the nonradiative loss of electrons and holes to the defects and/or impurities and the 41 (52) ns decay component is the lifetime of e-h (electron-hole) pairs at the band gap states as discussed by F. Wu, J. Z. Zhang, R. Kho, and R. K. Mehra, Chemical Physics Letters 330, 237 (2000). The lifetime is much longer than that observed for CdSe quantum dots of similar size (about 20 ns) as discussed by S. A. Crooker, J. A. Hollingsworth, S. Tretiak, and V. I. Klimov, Physical Review Letters 89, 186802 (2002).

Femotsecond transient absorption experiments have been used extensively to study the dynamical processes of optical gain in semiconductor quantum dots. See for example, V. I. Klimov, et al., Science 290, 314 (2000), A. A. Mikhailovsky, et al., Applied Physics Letters 80, 2380 (2002), S. Link and M. A. El-Sayed, Journal of Applied Physics 92, 6799 (2002), G. Chen, et al., Applied Physics Letters 87, 251108 (2005), and J. Butty, et al., Applied Physics Letters 67, 2672 (1995).

In these experiments, one monitors the change of absorption of the sample before and after excitation. If the absorbance before and after the irradiation is $\alpha_0$ and $\alpha$, respectively, then optical gain is achieved when the pump-induced absorption bleach (negative absorption or transmission) $-\Delta\alpha = -(\alpha - \alpha_0)$ is greater than $\alpha$ 0 (or $-\Delta\alpha/\alpha_0$ is >1). This is discussed by Klimov, et al., Mikhailovsky, et al., and Butty, et al.

Due to the overlap of the intense pump-induced absorption with the photoluminescence band, experiments with CdSe quantum dots solution of Klimov, et al., showed photoinduced absorption rather than bleach within the photoluminescence band. Numerous experiments have confirmed that the optical gain and ASE can only be observed in CdSe closely-packed quantum dot films and quantum dot-polymer matrices due to the absence of pump-induced absorption and high quantum dot loading fraction. See Klimov, et al., Mikhailovsky, et al., Butty, et al. and C. Sundar, H. J. Eisler, and M. G. Bawendi, Advanced Materials 14, 739 (2002).

Figure 3A:
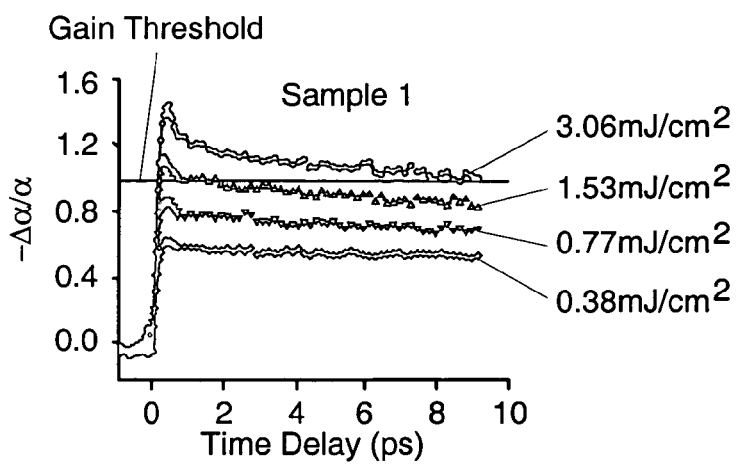
FIGS. 3a and 3b illustrates normalized transient absorption changes $-\Delta\alpha/\alpha_0$ of samples as a function of time delay induced by a 400 nm femtosecond laser at different pump fluence.
Figure 3B:
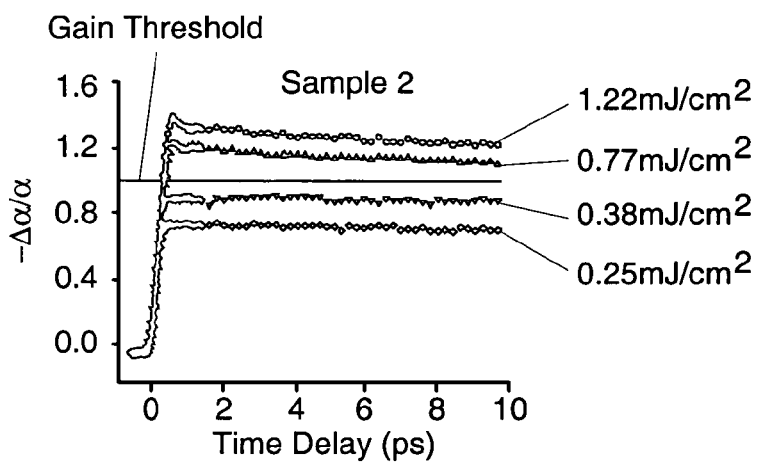
Figure 3C:
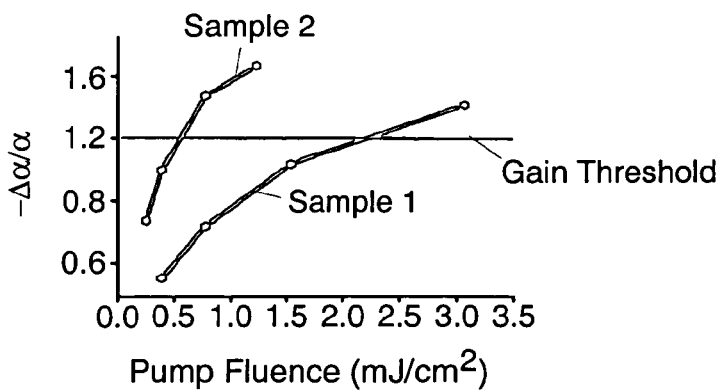
FIG. 3c is a graph illustrates pump intensity dependence of the normalized absorption changes $(-\Delta\alpha/\alpha_0)$ at a time delay of 6 picoseconds (ps).

However, as shown in FIGS. 3a-3c, there is no pump-induced absorption (or the pump-induced absorption is very weak) within the photoluminescence band in the CdS quantum dot solution 12. As a result, optical gain is directly observed at their photoluminescence peaks. One possible reason for the observable optical gain in CdS quantum dot solution 12 is that the pump wavelength (400 nm) is close to the emission wavelength (440 nm or 460 nm), which can eliminate the loss of electron-hole pairs due to trapping of defects. As shown by M. Kazes, D. Y. Lewis, Y. Ebenstein, T. Mokari, and U. Banin, Advanced Materials 14, 317 (2002), lasing has been achieved from a hexane solution of CdSe nanocrystals in a microcavity and the pump laser wavelength is set close to the band gap. In addition, Link et al. also showed that by moving the excitation laser wavelength closer to the band gap, the optical gain could be observed in CdSe nanorods solution.

FIGS. 3a and 3b present normalized transient absorption changes $-\Delta\alpha/\alpha_0$ as a function of time delay between the pump laser 13 with different fluence and the probe laser. The wavelength of the probe laser was set at 440 nm and 460 nm for the first and second sample solutions of quantum dots 11, respectively (the peak maxima of their photoluminescence spectra). FIG. 3c shows the pump intensity dependence of the normalized absorption changes ($-\Delta\alpha/\alpha_0$) at a delay time of 6 ps. For both samples, it was found that $-\Delta\alpha/\alpha_0$ could be greater than 1 (corresponding to optical gain). The thresholds of pump fluence ($-\Delta\alpha/\alpha_0=1$) for achieving optical gain are 2.24 mJ/cm$^2$ and 0.57 mJ/cm$^2$ for the first and second sample solutions of quantum dots 11, respectively. Klimov et al. (cited above) found that the gain threshold of quantum dots 11 scales roughly as $1/R^3$ (R is the size of the quantum dots). Based on their results, the threshold of the first sample solution of quantum dots 11 is only 70% higher than that of the second sample solution of quantum dots 11. However, here the gain threshold of the first sample solution of quantum dots 11 is nearly four times (or 300% higher) as high as that of the second sample solution of quantum dots 11. It is believed that this reflects the effects of sample quality on the optical gain threshold.

The band edge emission in II-VI semiconductor quantum dots is modeled as a two-level system with twofold spin-degenerate states, in the manner disclosed by V. I. Klimov, et al., Science 290, 314 (2000) and Y. Z. Hu, H. Giessen, N. Peyghambarian, and S. W. Koch, Physical Review B 53, 4814 (1996). The complete bleach of the band gap absorption (corresponding to gain threshold) occurs at the minimum carrier density of $N_{eh}=1$ ($N_{eh}$ is the number of electron-hole pairs per dot on average). The optical gain at the band edge emission is due to the transitions from the quantum-confined biexciton states to exciton states, such as is disclosed by Klimov, et al., Mikhailovsky, et al., Chan et al., and Hu, et al. In the sample with poor quality, there are many defects and impurities on the surfaces of the quantum dots, such as the unpassivated Se or S lone pair sites in the case of CdSe and CdS.

Experimental studies by Mikhailovsky, et al., Klimov, et al., Physical Review B 60, R2177 (1999), and D. F. Underwood, T. Kippeny, and S. J. Rosenthal, Journal of Physical Chemistry B 105, 436 (2001), showed that the holes could be trapped nonradiatively to these surface defects on the subpicosecond to picosecond time scale. This is faster than Auger recombination (several tens of picoseconds), discussed by V. I. Klimov, A. A. Mikhailovsky, D. W. McBranch, C. A. Leatherdale, and M. G. Bawendi, Science 287, 1011 (2000), and sets the limit for optical gain threshold. In order to observe optical gain, the excited carrier density of electron-hole pairs $N_{eh}$ needs to be well above 1 so that after saturating the surface defects, the biexciton-to-exciton transition can still occur. This explains that optical gain threshold depends on the sample quality.

The lifetime of optical gain under pump fluence higher than the threshold may be obtained from FIGS. 3a and 3b. The decay of optical gain is determined by two competitive processes, intrinsic multiparticle Auger recombination and nonintrinsic ultrafast hole trapping by surface defects, as discussed by Klimov, et al. in Science 290, 314, and Mikhailovsky, et al. For sample 2, under moderate pump fluence (0.77 mJ/cm$^2$), it took 20 ps (corresponding to an effective amplification length about 6 mm) for ($-\Delta\alpha/\alpha_0$) to decay to 1 (optical gain threshold) at room temperature. The 20 ps optical gain lifetime observed for CdS quantum dots, 11 which is related to the Auger recombination in CdS quantum dots 11, is longer compared with close-packed CdSe quantum dots film which is less than 10 ps even under higher pump fluence of 1.6 mJ/cm$^2$ (see Mikhailovsky et al.) The fact that CdS quantum dots 11 show gain in solution at relative lower pump fluence at room temperature, in spite of similar overlap between the emission maximum and the absorption bandedge spectrum as in CdSe, is due to the observed longer lifetimes of fluorescence and biexciton-to-exciton transitions and narrow fluorescence band width. This leads to the formation of the biexciton critical density (needed to achieve population inversion) at lower laser pump fluence.

Thus, optical gain has been observed in CdS nanocrystal quantum dots 11 in a strong confinement regime in a toluene solution 12 at room temperature using femtosecond transient absorption techniques. The optical gain dynamics of CdS quantum dots 11 is sample quality dependent, due to the ultrafast hole trapping processes by the defects. The optical gain lifetime is measured to be 20 picoseconds under pump fluence of 0.77 mJ/cm$^2$. The relative lower gain threshold compared to that of CdSe quantum dots 11 is attributed to the long lifetime of fluorescence and biexcitons and the relatively sharp photoluminescence linewidth. The CdS nanocrystal quantum dots 11 are excellent gain media for semiconductor quantum dot based blue lasers.

Thus, nanoparticle lasing complexes that comprise a room temperature solution comprising quantum dots, lasing apparatus, and lasing methods have been disclosed. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Lasing apparatus comprising:
    a room temperature liquid solution comprising quantum dots that each have an average diameter between 3 and 6 nanometers, and wherein all quantum dots in the liquid solution are substantially the same size, and wherein each quantum dot is capped with a capping material that passivates and protects the surface and acts to suspend the quantum dot in the liquid solution;
    reflective cavity apparatus for confining the room temperature liquid solution; and
    apparatus for exciting the room temperature liquid solution to induce lasing of the quantum dots.

2. The apparatus recited in claim 1, wherein the liquid solution comprises toluene.

3. The apparatus recited in claim 1, wherein the liquid solution comprises water.

4. The apparatus recited in claim 1, wherein the capping material comprises wide bandgap semiconductor material.

5. The apparatus recited in claim 4, wherein the wide bandgap semiconductor material comprises zinc sulfide.

6. The apparatus recited in claim 1, wherein the capping material comprises an organic molecule.

7. The apparatus recited in claim 6, wherein the organic molecule comprises tri-n-octylphosphine oxide (TOPO).

8. A method comprising:
    confining a room temperature liquid solution comprising quantum dots that each have an average diameter between 3 and 6 nanometers, and wherein all quantum dots in the solution are substantially the same size, and wherein each quantum dot is capped with a capping material that passivates and protects the surface and acts to suspend the quantum dot in the liquid solution; and
    exciting the room temperature liquid solution of quantum dots to induce lasing thereby.

9. The method recited in claim 8, wherein the liquid solution comprises toluene.

10. The method recited in claim 8, wherein the liquid solution comprises water.

11. The method recited in claim 8, wherein the capping material comprises wide bandgap semiconductor material.

12. The method recited in claim 11, wherein the wide bandgap semiconductor material comprises zinc sulfide.

13. The method recited in claim 8, wherein the capping material comprises an organic molecule.

14. The method recited in claim 13, wherein the organic molecule comprises tri-n-octylphosphine oxide (TOPO).

15. A nanoparticle lasing complex comprising:
    a room temperature liquid solution comprising quantum dots that each have an average diameter between 3 and 6 nanometers, and wherein all quantum dots in the solution are substantially the same size, and wherein each quantum dot is capped with a capping material that passivates and protects the surface and acts to suspend the quantum dot in the liquid solution.

16. The complex recited in claim 15, wherein the liquid solution comprises toluene.

17. The complex recited in claim 15, wherein the liquid solution comprises water.

18. The complex recited in claim 15, wherein the capping material comprises wide bandgap semiconductor material.

19. The complex recited in claim 18, wherein the wide bandgap semiconductor material comprises zinc sulfide.

20. The complex recited in claim 15, wherein the capping material comprises an organic molecule.

21. The complex recited in claim 20, wherein the organic molecule comprises tri-n-octylphosphine oxide (TOPO).

* * * * *